S. Horney,
Plow,
Nº 9,646 — Patented Apr. 5, 1853.
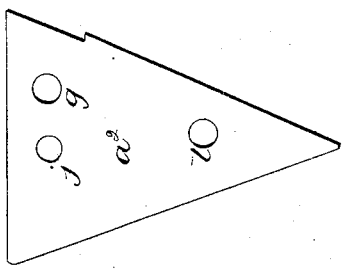
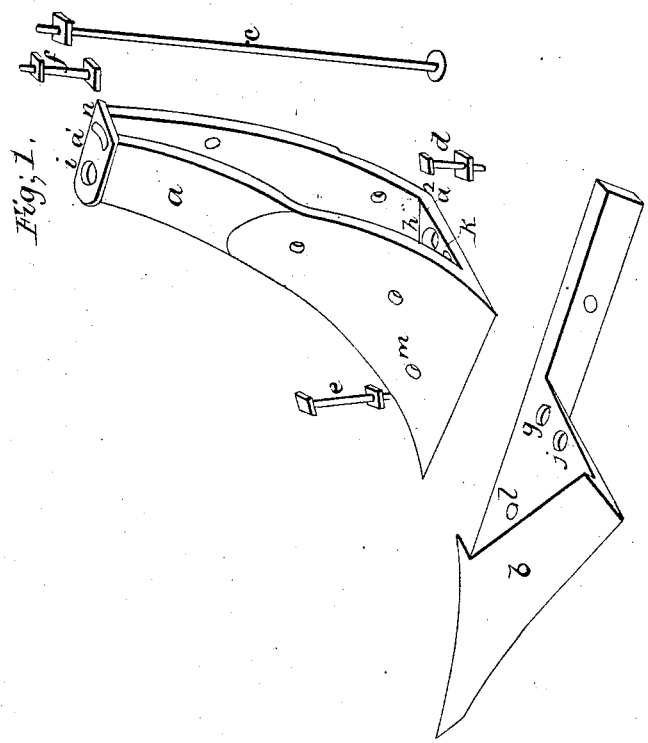

UNITED STATES PATENT OFFICE.

SOLOMON HORNEY, JR., OF RICHMOND, INDIANA.

IMPROVEMENT IN PLOWS.

Specification forming part of Letters Patent No. 9,646, dated April 5, 1853.

*To all whom it may concern:*

Be it known that I, SOLOMON HORNEY, JR., of Richmond, in the county of Wayne and State of Indiana, have invented certain new and useful Improvements in Plows; and I do hereby declare that the following is a full, clear, and exact description thereof, reference being had to the accompanying drawings, forming a part of this specification.

My invention relates to the construction of the shank and the mode of securing the same to the beam and share.

Figure 1 of the said drawings represents the shank detached and the bolts for securing the same to the beam and share; Fig. 2, plan of the base of shank, and Fig. 3 perspective view of my plow with its parts in connection.

The shank $a$ is made hollow, (cast in any suitable metal,) with two closed ends, one of which, $a'$, is the top, on which the under side of the beam rests, and the other one, $a^2$, is the base, which rests against the share $b$; $c$, a master-bolt, which is sufficiently long to extend through the share, shank, and beam, and has a head at one end and a thread cut on the other end, over which screws a nut. $d$ and $e$ and $f$ are short bolts of a similar nature, also provided with heads and nuts. Said master-bolt is designed to pass through the hole $g$ in share, hole $h$ in base, hole $i$ in top, and through the beam, for the purpose of binding firmly together the share, shank, and beam. Said bolt $d$ is for giving additional security to the fastening of the share to the shank by passing through a hole, $j$, in share and a hole, $k$, in base. It also answers as a temporary security when the master-bolt is removed. Said bolt $e$ is intended as one of the means for securing the mold-board to its place on the shank by passing in a slanting direction through hole $l$ in the share, a hole, $m$, in shank, and a hole in mold-board. Said bolt $f$ is designed to pass through a semicircular slot, $n$, in the top of said shank, and through the beam, and is for the purpose of giving additional strength to the fastening of the beam to the shank, and also adjusting the plow to the beam for varying or altering the land.

This mode of constructing the shank possesses strength, cheapness, and durability, and admits of a more secure fastening of it with the share and beam, and the ends of the bolts and their nuts, which usually project on the landside and offer obstacles to a free passage of the plow through the ground, are by this improvement sheathed, leaving a smooth and unincumbered outer surface.

Having thus fully described my invention, what I claim as new, and desire to secure by Letters Patent, is—

Constructing the shank hollow in a single piece, with two closed ends, substantially as described, and securing the same to and with the share and beam by means of the master-bolt, and the short bolt passing through the slot in the top end of the hollow shank, for varying the position of the shank with the beam and for giving additional security to the fastening of the same, substantially as herein set forth.

In testimony whereof I have hereunto signed my name before two subscribing witnesses.

SOLOMON HORNEY, JR.

Witnesses:
J. M. HUTTON,
STEPHEN R. WIGGINS.